(12) United States Patent
Liu (10) Patent No.: US 12,513,836 B2
(45) Date of Patent: Dec. 30, 2025

(54) ASSEMBLY STRUCTURE OF CRUTCH HANDLE

(71) Applicant: HOMECARE ENTERPRISE CO., LTD., Changhua County (TW)

(72) Inventor: Shih-Chieh Liu, Changhua County (TW)

(73) Assignee: HOMECARE ENTERPRISE CO., LTD., Changhua County (TW)

( * ) Notice: Subject to any disclaimer, the term of this patent is extended or adjusted under 35 U.S.C. 154(b) by 186 days.

(21) Appl. No.: 18/427,572

(22) Filed: Jan. 30, 2024

(65) Prior Publication Data

US 2025/0247972 A1 Jul. 31, 2025

(51) Int. Cl.
| | |
|---|---|
| H05K 5/02 | (2006.01) |
| A45B 3/00 | (2006.01) |
| A45B 9/02 | (2006.01) |
| A61F 7/00 | (2006.01) |
| A61H 23/02 | (2006.01) |
| H05K 5/03 | (2006.01) |
| H05K 7/14 | (2006.01) |

(52) U.S. Cl.
CPC ............. *H05K 5/0217* (2013.01); *A45B 3/00* (2013.01); *A45B 9/02* (2013.01); *A61F 7/007* (2013.01); *A61H 23/0263* (2013.01); *H05K 5/0247* (2013.01); *H05K 5/03* (2013.01); *H05K 7/1427* (2013.01); *A61F 2007/0036* (2013.01); *A61F 2007/0071* (2013.01); *A61F 2007/0087* (2013.01); *A61H 2201/0153* (2013.01); *A61H 2205/065* (2013.01)

(58) Field of Classification Search
USPC .......................... 361/728, 752, 807, 809, 810
See application file for complete search history.

(56) References Cited

U.S. PATENT DOCUMENTS

| | | | | |
|---|---|---|---|---|
| 10,993,874 B1 | * | 5/2021 | Marton | ..................... A61H 1/00 |
| 2008/0272103 A1 | * | 11/2008 | Farrington | ............... H05B 3/06 |
| | | | | 15/105 |
| 2023/0082119 A1 | * | 3/2023 | Francis | .................. A61H 11/00 |
| | | | | 601/101 |

FOREIGN PATENT DOCUMENTS

CN 106345066 A * 1/2017 ........... A61N 5/0625

* cited by examiner

*Primary Examiner* — Hung S. Bui (57) ABSTRACT

An assembly structure of a crutch handle includes a handle body, a top case, and an upper cover. The handle body is T-shaped and has a grip part and an assembly part. The grip part is provided with a hollow accommodation space. A battery room is communicated between the accommodation space and the assembly part to provide storage space for a battery, the accommodating space is defined as a circuit board room and a motor room to install an eccentric motor and a circuit board. The crutch handle of the present invention has the additional function of vibration or heating, which helps to improve the practicality of the structure. Moreover, the structure is simple and easy for the user to disassemble and assemble.

9 Claims, 8 Drawing Sheets

ASSEMBLY STRUCTURE OF CRUTCH HANDLE

BACKGROUND OF THE INVENTION

Field of the Invention

This invention relates to a crutch structure, particularly an assembly structure of a crutch handle.

Description of the Related Art

The conventional structure of crutches on the market is a handle body combined with a wood or metal column at the top so that the user can hold the handle body as a walking aid. Most of the users who use crutches are people with limited mobility or the elderly, and most of them have poor blood circulation. Poor blood circulation will cause coldness and discomfort in the hands and feet, as well as peripheral neuropathy and numbness. To improve and alleviate the discomfort, the structural design of the crutch handle may install functional structures in the crutch handle. However, this also increases the complexity of the handle structure and is not conducive to consumers' disassembly and replacement by themselves, therefore lack of convenience of use and reducing consumers' willingness to purchase.

SUMMARY OF THE INVENTION

The technical problem to be solved by this invention is to provide an assembly structure of a crutch handle that has additional functions of vibration or heating and is convenient for users to disassemble and assemble by themselves.

An assembly structure of a crutch handle includes a handle body, a top case, and an upper cover. The handle body is T-shaped and has a grip part and an assembly part. The grip part is provided with a hollow accommodation space and an upper opening communicating with the accommodation space. A battery room is communicated between the accommodation space and the assembly part to provide storage space for a battery, the accommodating space is defined as a circuit board room and a motor room, the circuit board room is adjacent to one end of the grip part, and a switch hole and a charging hole are provided at the outer edge of the grip part to communicate with the circuit board room. The accommodation space is provided with a plurality of combination columns, and each of the combination columns is provided a combination perforation from the bottom of the grip part upward. The top case is relatively fitted and assembled at the upper opening of the grip part, and a functional part is recessed on the surface of the top case. The functional part is provided with a through hole corresponding to the motor room, and the functional part is provided with a plurality of plug holes along the periphery. The bottom of the top case is protrudingly provided with a plurality of binding column with internal threaded holes, the binding column are respectively aligned with the combination column, and the binding column and the combination column are connected and fixed through a plurality of screws. The bottom of the upper cover is provided with a plurality of plug pins along the periphery, and the plug pins are aligned and inserted into the plug holes of the top case to make the upper cover covering and fixing the functional part.

Preferably, the circuit board room is equipped with a circuit board, which is electrically connected to the battery and provided with a switch and a charging slot. The switch is fitted and fixed to the switch hole, the charging slot is embedded in the charging hole, and the outer end of the charging hole is sealed and fixed by a waterproof plug.

Preferably, the outer end of the grip part is equipped with a perspective window communicating with the circuit board room, the circuit board is provided with a power monitoring luminous body to monitor and display the power of the battery, the power monitoring luminous body faces the perspective window, and a light guide strip is sandwiched between the power monitoring luminous body and the perspective window to further clearly display the power of the battery in the perspective window.

Preferably, the switch hole of the grip part is a semicircular opening, one end of the top case is further provided with a semicircular hole corresponding to the switch hole, and the switch hole and the semicircular hole form a complete hole to fit and fix the switch.

Preferably, an eccentric motor is installed in the motor room, and the eccentric motor is electrically connected to the circuit board and powered by the battery, and the switch is used to turn on and off the eccentric motor.

Preferably, a plurality of assembly holes are provided through the surface of the functional part from top to bottom, a plurality of connection columns with internal threaded holes are protruding from the bottom of the upper cover, the connection columns are aligned and assembled into the assembly holes, the connection column and the assembly hole are connected and fixed through a plurality of bolts, a hollow case column is protruding from the bottom of the upper cover, and the hollow case column passes downward through the through hole and covers the eccentric motor.

Preferably, the upper cover further includes a heating plate, the heating plate is electrically connected to the circuit board and is powered by the battery, the switch is used to turn on and off the heating plate, and there is a thermal resistor between the heating plate and the circuit board used to sense the temperature of the heating plate, when the temperature of the heating plate is too high, the power is cut off through the circuit board to avoid accidental burns.

Preferably, the upper cover is made of metal having flexible characteristics, so that after the plug pin penetrates into the plug hole of the top case, its end can be turned over and bent to be fastened and fixed to achieve the positioning purpose.

Preferably, the assembly part of the handle body is assembled at one end of a crutch tube body, the crutch tube body is hollow and has a battery chamber inside, the battery can be moved down from the battery room of the assembly part to the battery chamber, and a cushion pad is provided at the bottom of the battery chamber.

Compared to the conventional crutch structure, the present invention has the following benefits. In addition to the basic holding use, the crutch handle of the present invention also has the additional function of vibration or heating, which helps to improve the practicality of the structure. Moreover, the structure of the handle body, the top case, and the upper cover is simple and easy for the user to disassemble and assemble, so that the user can disassemble and assemble by himself for repair or replacement, thereby improving the convenience of use.

BRIEF DESCRIPTION OF THE DRAWINGS

The following drawings are merely examples for illustrative purposes according to various disclosed embodiments and are not intended to limit the scope of the present disclosure.

DETAILED DESCRIPTION OF THE INVENTION

Figure 1:
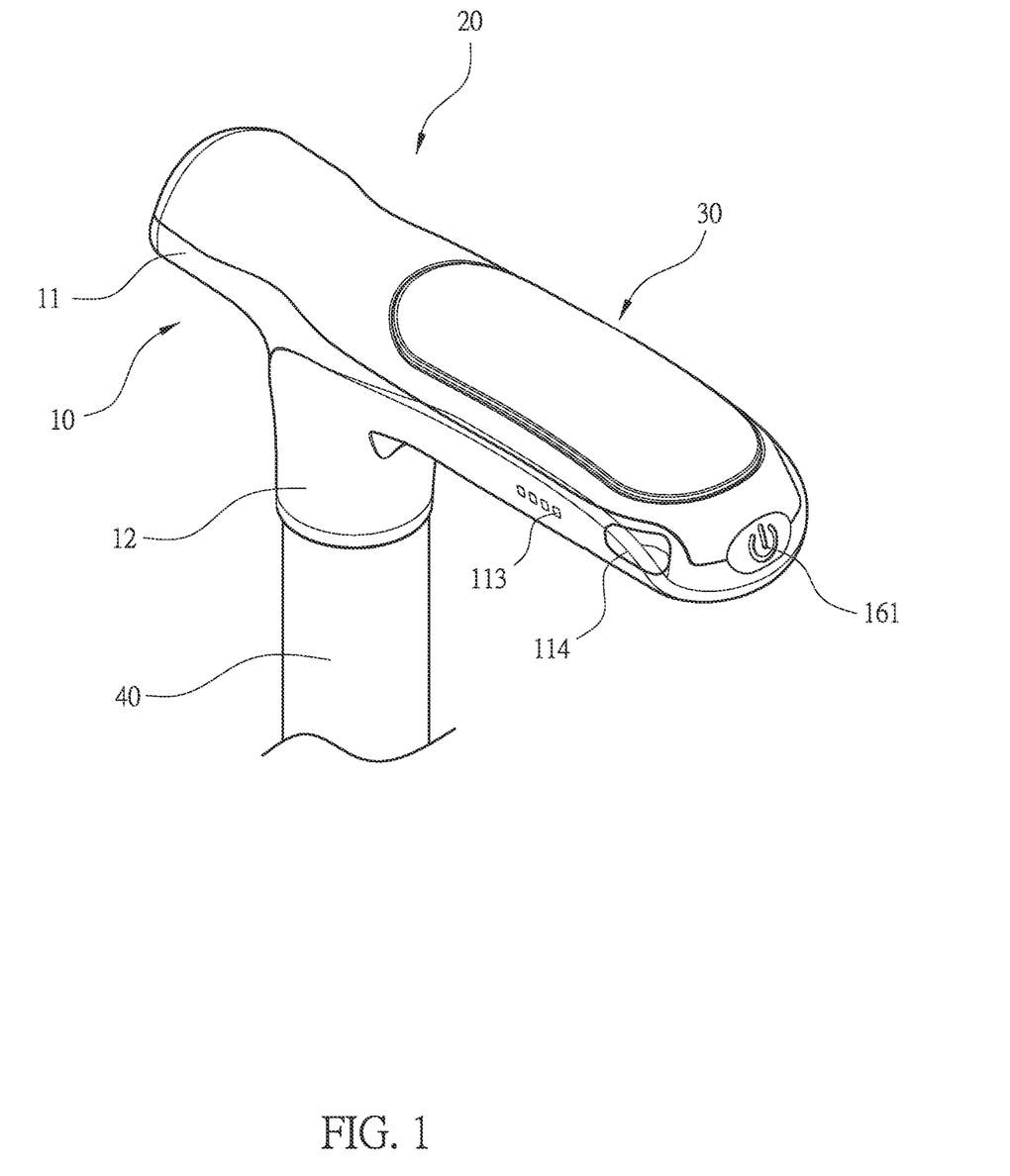
FIG. 1 is a three-dimensional view of this invention.
Figure 2:
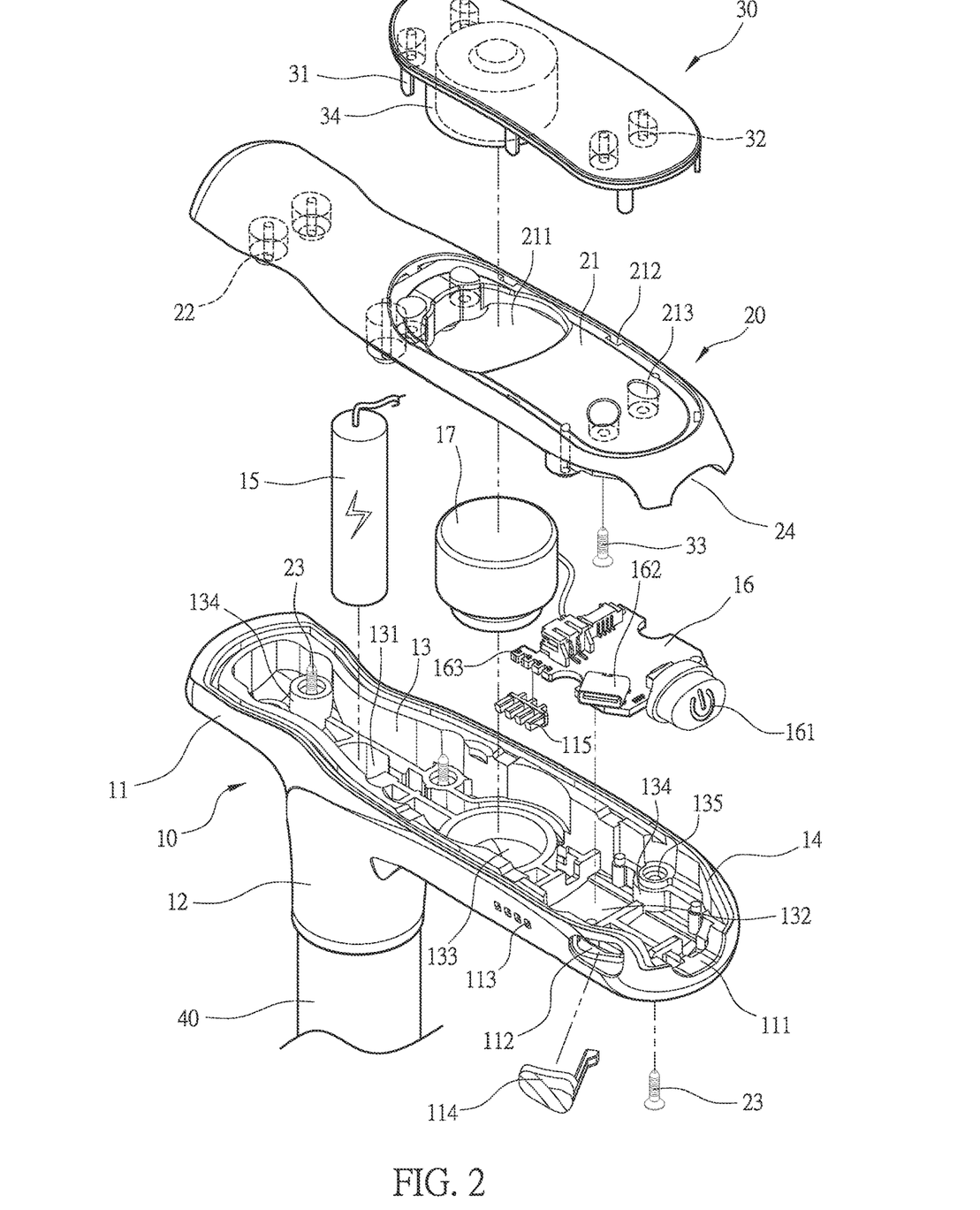
FIG. 2 is an exploded view of this invention.

First, as shown in FIGS. 1-2, an assembly structure of a crutch handle includes a handle body 10, a top case 20, and an upper cover 30. The handle body 10 is T-shaped and has a grip part 11 and an assembly part 12. The grip part 11 is provided with a hollow accommodation space 13 and an upper opening 14 communicating with the accommodation space 13. A battery room 131 is communicated between the accommodation space 13 and the assembly part 12 to provide storage space for a battery 15, the accommodating space 13 is defined as a circuit board room 132 and a motor room 133, the circuit board room 132 is adjacent to one end of the grip part 11 and a switch hole 111, a charging hole 112 and a perspective window 113 are provided at the outer edge of the grip part 11 to communicate with the circuit board room 132. The circuit board room 132 is equipped with a circuit board 16, which is electrically connected the battery 15 and provided with a switch 161, a charging slot 162, and a power monitoring luminous body 163. The switch 161 is fitted and fixed to the switch hole 111, and the charging slot 162 is embedded in the charging hole 112. The outer end of the charging hole 112 is sealed and fixed by a waterproof plug 114. The power monitoring luminous body 163 is used to monitor and display the power of the battery 15. The power monitoring luminous body 163 faces the perspective window 113, and a light guide strip 115 is sandwiched between the power monitoring luminous body 163 and the perspective window 113 to further clearly display the power of the battery 15 in the perspective window 113. An eccentric motor 17 is installed in the motor room 133, and the eccentric motor 17 is electrically connected to the circuit board 16 and powered by the battery 15. The switch 161 is used to turn on and off the eccentric motor 17. The accommodation space 13 is provided with a plurality of combination columns 134, and each of the combination columns 134 is provided a combination perforation 135 from the bottom of the grip part 11 upward.

The top case 20 is relatively fitted and assembled at the upper opening 14 of the grip part 11, and an functional part 21 is recessed on the surface of the top case 20. The functional part 21 is provided with a through hole 211 corresponding to the motor room 133, the functional part 21 is provided with a plurality of plug holes 212 along the periphery, and a plurality of assembly holes 213 are provided through the surface of the functional part 21 from top to bottom. The bottom of the top case 20 is protrudingly provided with a plurality of binding column 22 with internal threaded holes. The binding column 22 are respectively aligned with the combination column 134, and the binding column 22 and the combination column 134 are connected and fixed through a plurality of screws 23.

The bottom of the upper cover 30 is provided with a plurality of plug pins 31 along the periphery, and the plug pins 31 are aligned and inserted into the plug holes 212 of the top case 20. A plurality of connection columns 32 with internal threaded holes are protruding from the bottom of the upper cover 30, the connection columns 32 are aligned and assembled into the assembly holes 213, and the connection column 32 and the assembly hole 213 are connected and fixed through a plurality of bolts 33. A hollow case column 34 is protruding from the bottom of the upper cover 30, and the hollow case column 34 passes downward through the through hole 211 and covers the eccentric motor 17. The switch hole 111 of the grip part 11 is a semicircular opening. One end of the top case 20 is further provided with a semicircular hole 24 corresponding to the switch hole 111, and the switch hole 111 and the semicircular hole 24 form a complete hole to fit and fix the switch 161.

Figure 3:
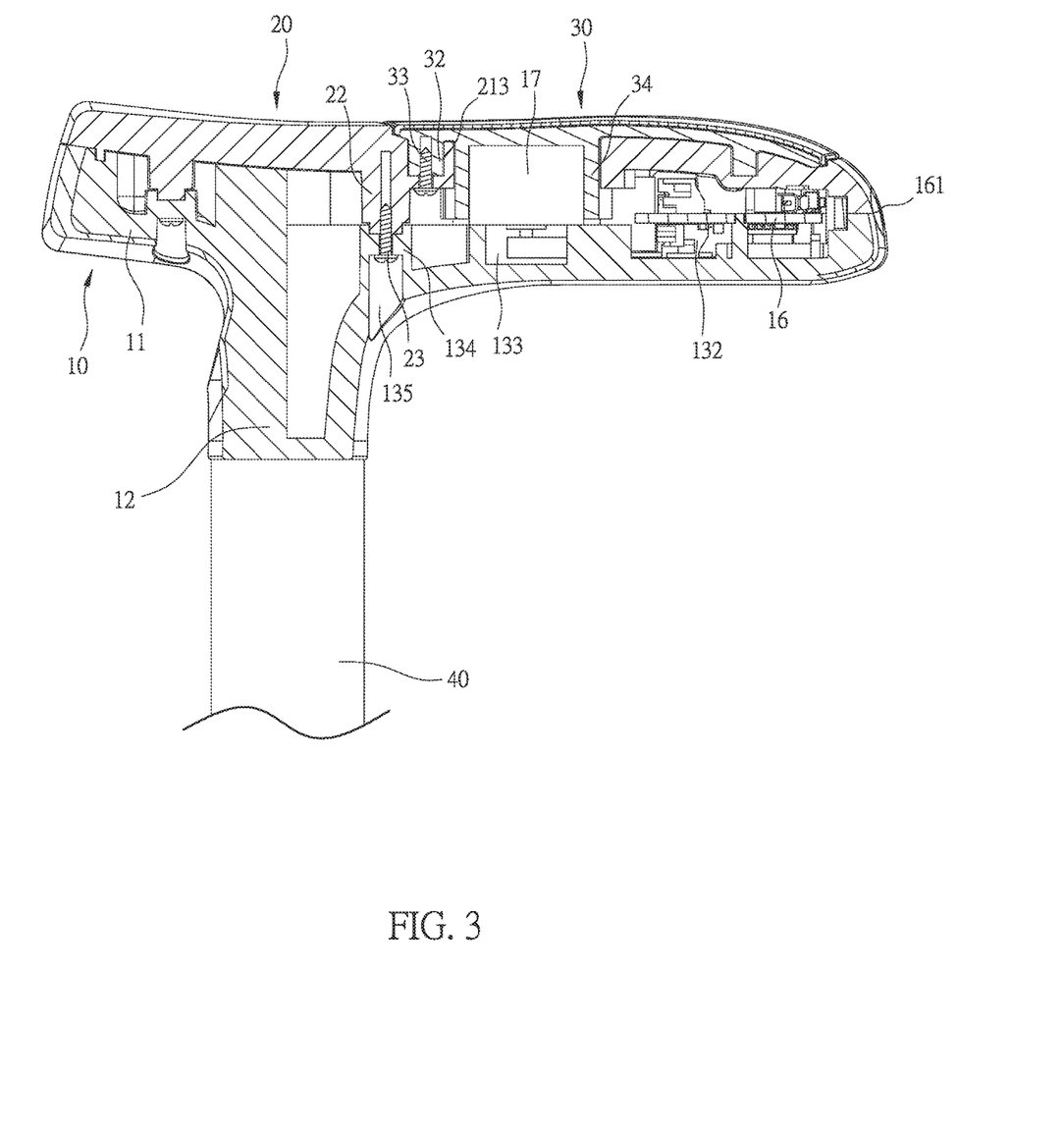
FIG. 3 is a combined cross-sectional view of this invention.
Figure 4:
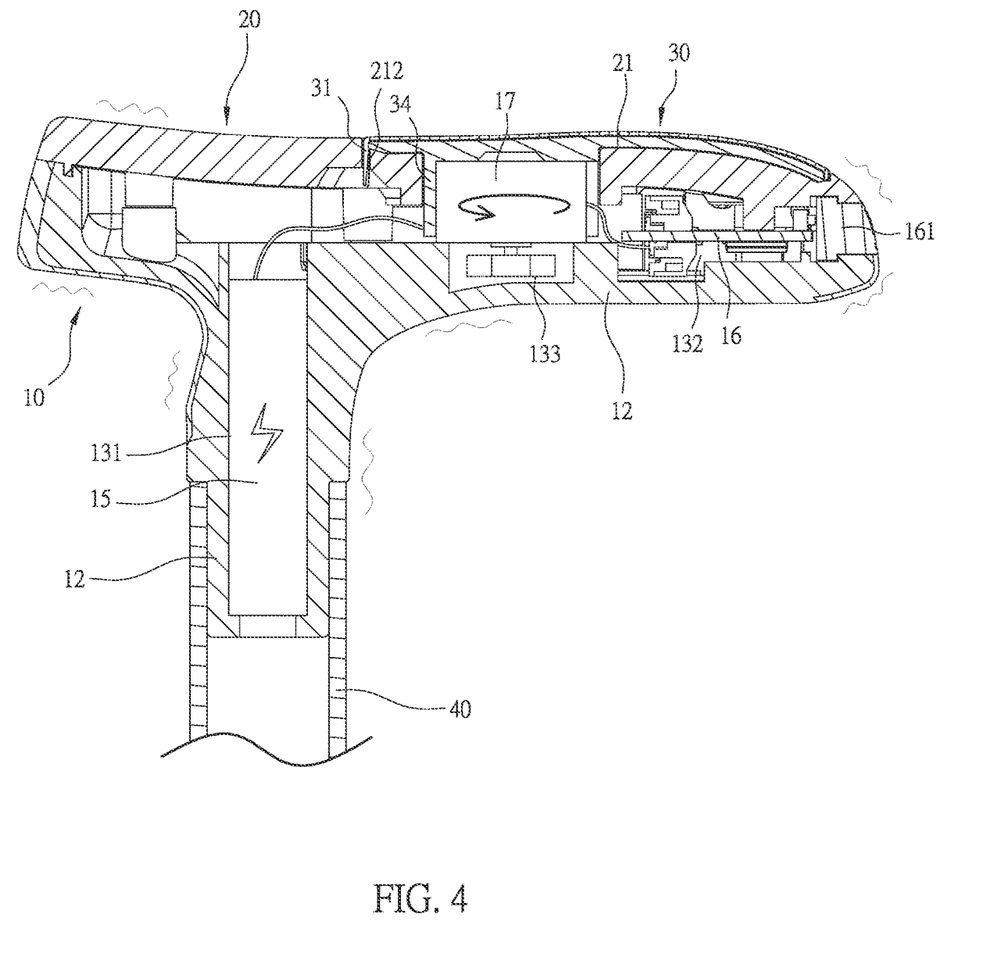
FIG. 4 is a combined cross-sectional view from another angle and a schematic diagram of the vibration state of this invention.

The structural composition can be further seen from FIGS. 2-4. The assembly part 12 of the handle body 10 is assembled at one end of a crutch tube body 40. The accommodation space 13 of the grip part 11 is disposed of a battery 15, a circuit board 16, and an eccentric motor 17 that are electrically connected to each other through the battery room 131, the circuit board room 132 and the motor room 133. The switch 161 and the charging slot 162 of the circuit board 16 are correspondingly installed in the switch hole 111 and the charging hole 112 of the grip part 11. The upper cover 30 is assembled on the functional part 21 of the top case 20, wherein the plug pins 31 and the connection column 32 of the upper cover 30 are respectively aligned with the plug hole 212 and the assembly hole 213 of the functional part 21, the hollow case column 34 is passed through the through hole 211, and a plurality of bolts 33 are used to screw and fix the connection column 32 from the bottom to the top through the assembly hole 213, thereby the upper cover 30 covers the functional part 21. The top case 20 is assembled on the upper opening 14 of the grip part 11, the binding columns 22 at the bottom of the top case 20 are aligned and stacked on the corresponding combination columns 134, and the hollow case column 34 of the upper cover 30 covers the outside of the eccentric motor 17, so that the vibration generated by the eccentric motor 17 can be transmitted to the functional part 21 and the upper cover 30 through the hollow case column 34. Finally, a plurality of screws 23 are used to pass upward from the bottom of the grip part 11 through the combination perforation 135 of the combination column 134 to screw and fix the binding column 22 of the top case 20, thereby completing the assembly of the crutch handle.

The actual use state of this structure can be seen in FIG. 4. The handle body 10 is for the user to hold and support the ground through the crutch to assist walking. The eccentric motor 17 provided inside the handle body 10 can be controlled by the switch 161. When the eccentric motor 17 runs eccentrically, it will generate vibrations and transmit the vibrations through the hollow case column 34 to the through hole 211 of the functional part 21 and the upper cover 30, that allows the palm of the hand holding the handle body 10 to have a vibration massage effect. The intensity of the vibration can be adjusted by pressing the switch 161 to facilitate user needs to change and adjust, thereby helping to activate peripheral nerves and promote blood circulation in transporting oxygen, further achieving heart health effects and avoiding the occurrence of heart diseases such as myocardial infarction.

Figure 5:
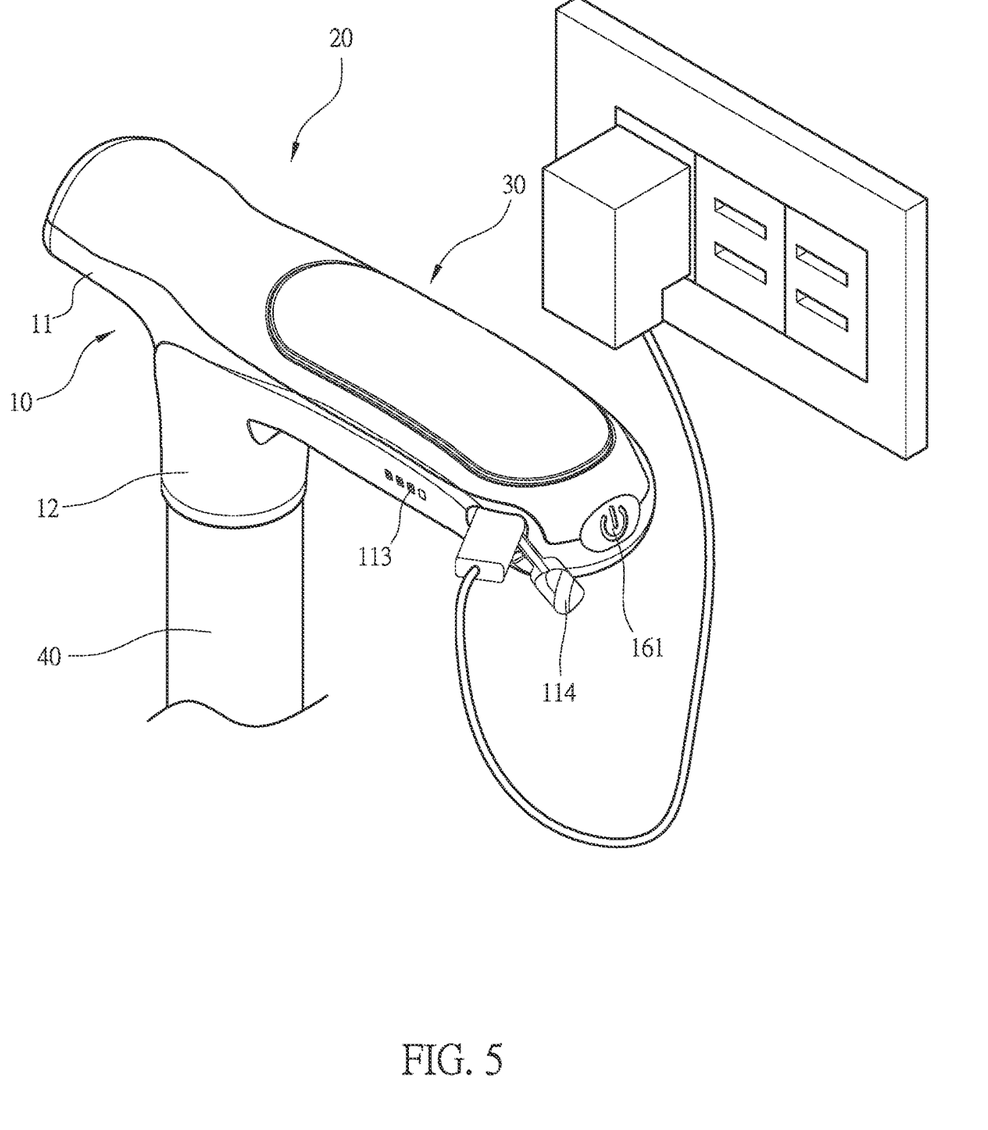
FIG. 5 is the charging diagram of this invention.

Further, when the battery 15 is low in power, as shown in FIG. 5, the charging slot 162 can be connected to a wall socket or a portable power supply for charging through a charging cable, and through the perspective window 113 to obtain the residual power and charging status of the battery 15 that helps to reduce waste batteries, avoids environmental pollution, and has environmental benefits and convenience of use.

Figure 6:
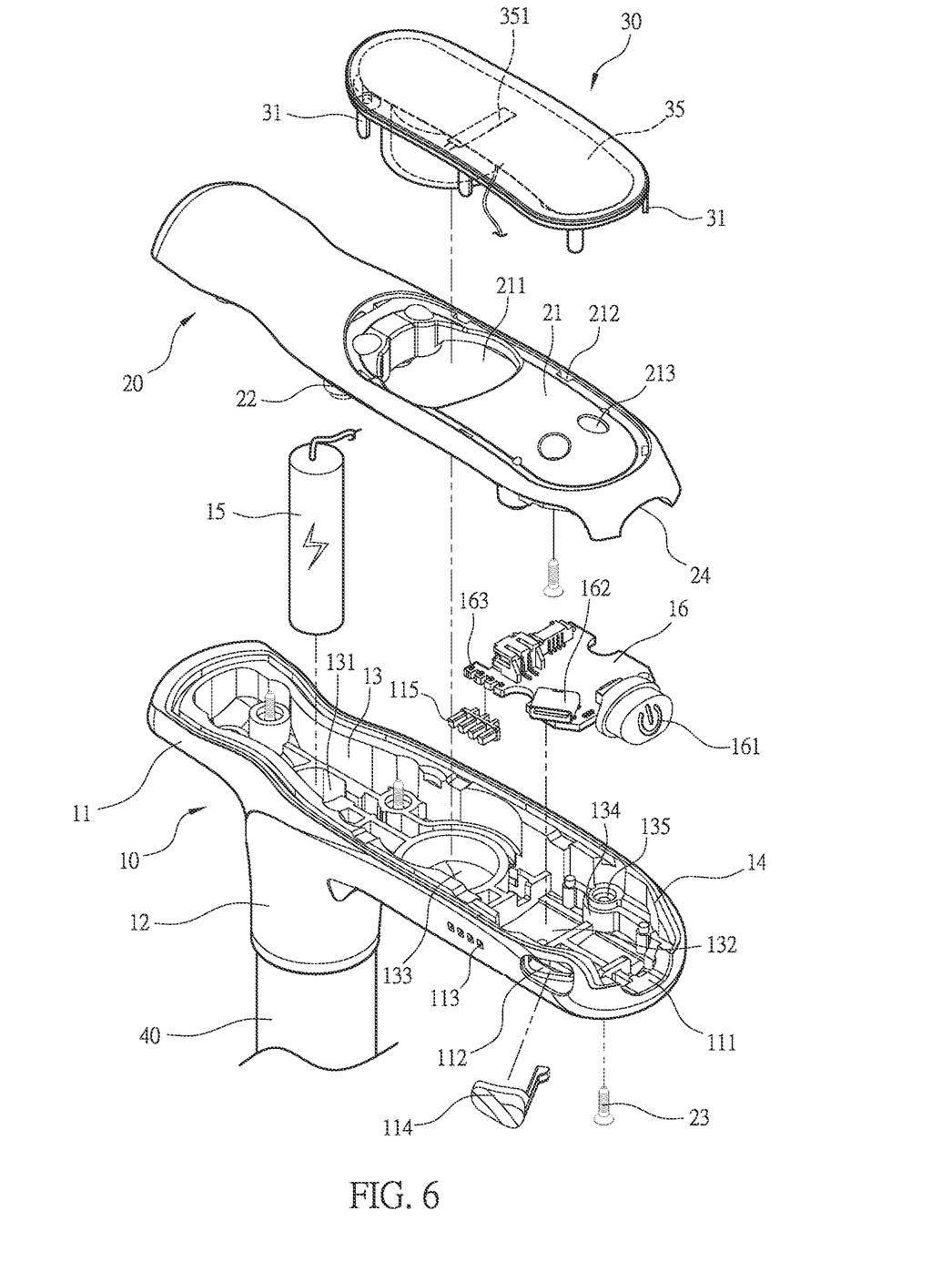
FIG. 6 is an exploded view of another embodiment of this invention.
Figure 7:
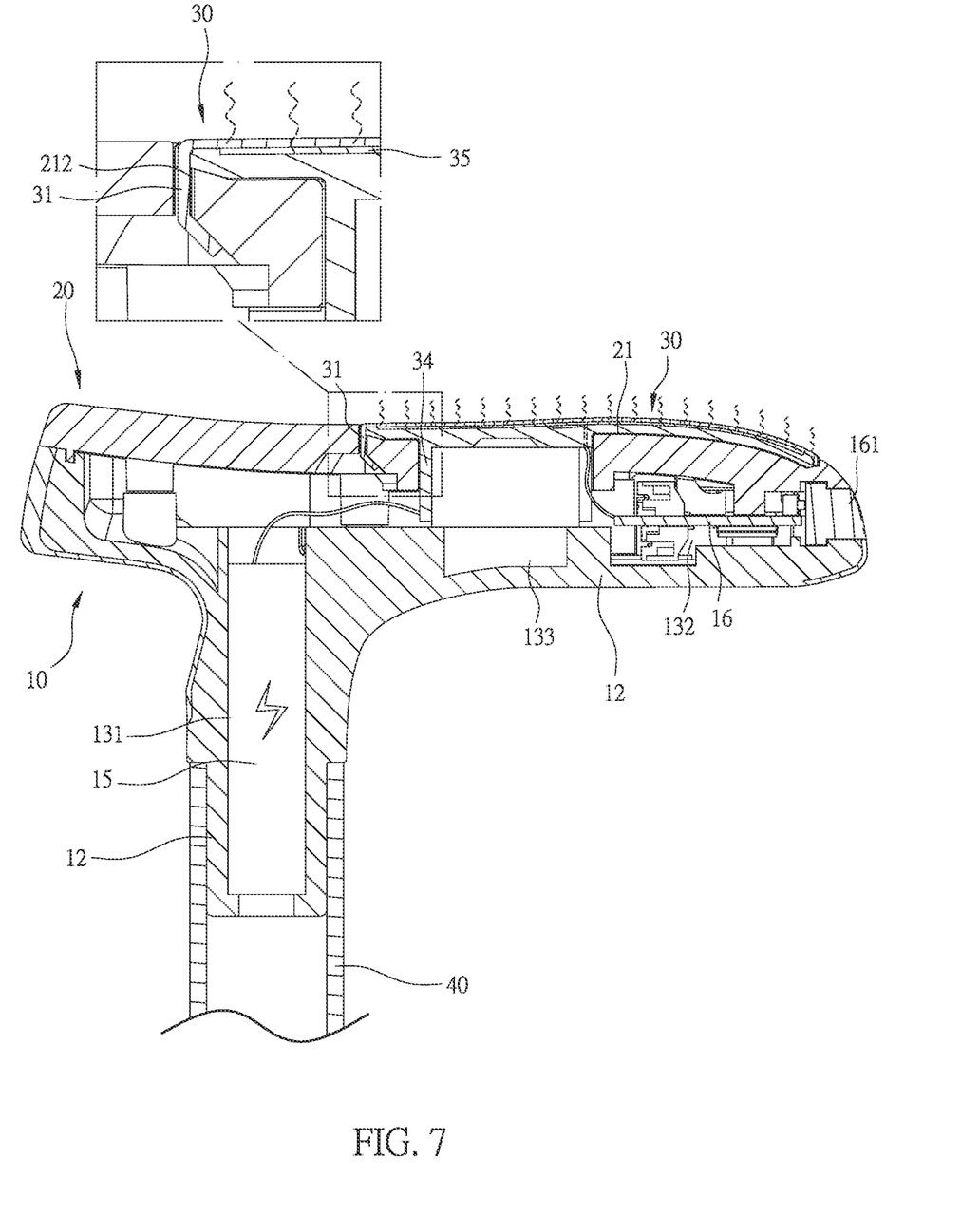
FIG. 7 is a combined cross-sectional view and a schematic diagram of the heating state of another embodiment of the invention.

The handle body 10, the top case 20, and the upper cover 30 are assembled structures that fit together and are combined by screw locks. The structure is simple and convenient for the user to disassemble and assemble by themselves, allowing the user to replace or repair the battery 15, the circuit board 16, or the eccentric motor 17 that maintains the fun of DIY. Moreover, the upper cover 30 can also be a cover body including a heating plate 35, as shown in FIGS. 6-7. The heating plate 35 is electrically connected to the circuit board 16 and is powered by the battery 15. The switch 161 is used to turn on and off the heating plate 35, and there is a thermal resistor 351 between the heating plate 35 and the circuit board 16, used to sense the temperature of the heating plate 35. When the temperature of the heating plate 35 is too high, the power is cut off through the circuit board 16 to avoid accidental burns. The upper cover 30 with the heating plate 35 can be made of metal having flexible characteristics, so that after the plug pin 31 penetrates into the plug hole 212 of the top case 20, its end can be turned over and bent to be fastened and fixed with the bottom surface of the top case 20, thereby achieving rapid assembly and positioning purpose. Accordingly, the handle body 10 can be assembled and used with one of the vibration and heating functions, so that in addition to the vibration function, the crutch grip also has the function of keeping hands warm, and it is also easy to disassemble and assemble allowing users to disassemble and replace it by themselves, improving the practicality of the structure.

In addition, the eccentric motor 17 and the heating plate 35 are assembled with the handle body 10 and the upper cover 30 respectively, and the two elements do not interfere with each other, so that the crutch handle can be equipped with the eccentric motor 17 and the heating plate 35 at the same time. Through the integration and design of the circuit board 16 and the switch 161, the effect of using the two functions of vibration and heating in parallel can be achieved or switched, further enhancing the added value of the crutch handle.

Figure 8:
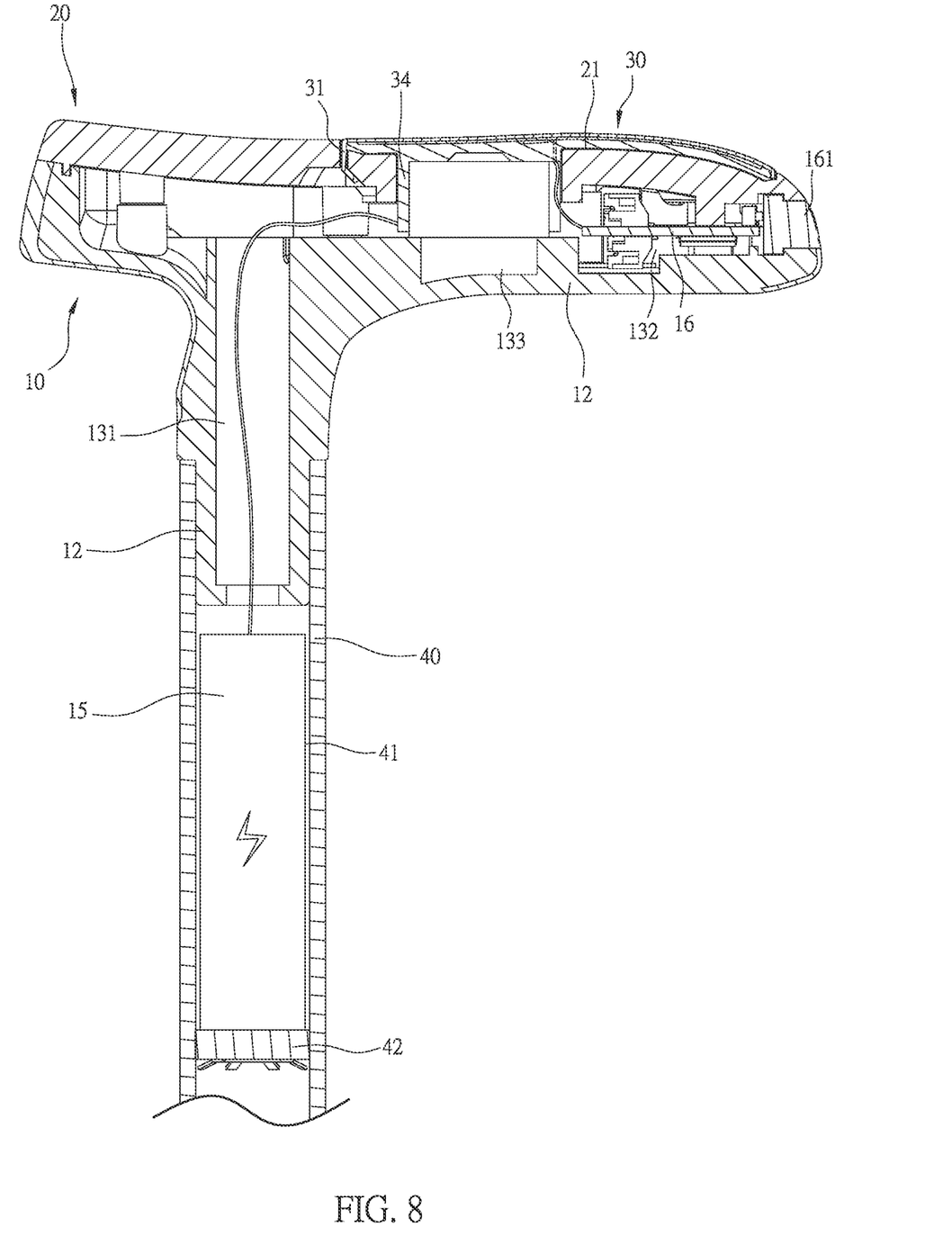
FIG. 8 is a schematic diagram of the battery of this invention being installed inside the crutch tube body.

Furthermore, the crutch tube body 40 is hollow and has a battery chamber 41 inside, as shown in FIG. 8. The battery 15 can be moved down from the battery room 131 of the assembly part 12 to the battery chamber 41. A cushion pad 42 is provided at the bottom of the battery chamber 41.

Through the structure of the above-mentioned embodiments, the following benefits can be obtained. In addition to the basic holding use, the crutch handle of the present invention also has the additional function of vibration or heating, which helps to improve the practicality of the structure. Moreover, the structure of the handle body 10, the top case 20, and the upper cover 30 is simple and easy for the user to disassemble and assemble, so that the user can disassemble and assemble by himself for repair or replacement, thereby improving the convenience of use.

What is claimed is:

1. An assembly structure of a crutch handle, comprising:
a handle body, wherein the handle body is T-shaped and has a grip part and an assembly part, the grip part is provided with a hollow accommodation space and an upper opening communicating with the accommodation space, a battery room is communicated between the accommodation space and the assembly part to provide storage space for a battery, the accommodating space is defined as a circuit board room and a motor room, the circuit board room is adjacent to one end of the grip part, and a switch hole and a charging hole are provided at the outer edge of the grip part to communicate with the circuit board room, the accommodation space is provided with a plurality of combination columns, and each of the combination columns is provided a combination perforation from the bottom of the grip part upward;
a top case, wherein the top case is relatively fitted and assembled at the upper opening of the grip part, and a functional part is recessed on the surface of the top case, the functional part is provided with a through hole corresponding to the motor room, the functional part is provided with a plurality of plug holes along the periphery, the bottom of the top case is protrudingly provided with a plurality of binding column with internal threaded holes, the binding column are respectively aligned with the combination column, and the binding column and the combination column are connected and fixed through a plurality of screws; and
an upper cover, wherein the bottom of the upper cover is provided with a plurality of plug pins along the periphery, the plug pins are aligned and inserted into the plug holes of the top case to make the upper cover covering and fixing the functional part.

2. The assembly structure of the crutch handle of claim 1, wherein the circuit board room is equipped with a circuit board, which is electrically connected to the battery and provided with a switch and a charging slot, the switch is fitted and fixed to the switch hole, the charging slot is embedded in the charging hole, and the outer end of the charging hole is sealed and fixed by a waterproof plug.

3. The assembly structure of the crutch handle of claim 2, wherein the outer end of the grip part is equipped with a perspective window communicating with the circuit board room, the circuit board is provided with a power monitoring luminous body to monitor and display the power of the battery, the power monitoring luminous body faces the perspective window, and a light guide strip is sandwiched between the power monitoring luminous body and the perspective window to further clearly display the power of the battery in the perspective window.

4. The assembly structure of the crutch handle of claim 2, wherein the switch hole of the grip part is a semicircular opening, one end of the top case is further provided with a semicircular hole corresponding to the switch hole, and the switch hole and the semicircular hole form a complete hole to fit and fix the switch.

5. The assembly structure of the crutch handle of claim 2, wherein an eccentric motor is installed in the motor room, and the eccentric motor is electrically connected to the circuit board and powered by the battery, and the switch is used to turn on and off the eccentric motor.

6. The assembly structure of the crutch handle of claim 5, wherein a plurality of assembly holes are provided through the surface of the functional part from top to bottom, a plurality of connection columns with internal threaded holes are protruding from the bottom of the upper cover, the connection columns are aligned and assembled into the assembly holes, the connection column and the assembly hole are connected and fixed through a plurality of bolts, a hollow case column is protruding from the bottom of the upper cover, and the hollow case column passes downward through the through hole and covers the eccentric motor.

7. The assembly structure of the crutch handle of claim 2, wherein the upper cover further includes a heating plate, the heating plate is electrically connected to the circuit board and is powered by the battery, the switch is used to turn on and off the heating plate, and there is a thermal resistor between the heating plate and the circuit board used to sense the temperature of the heating plate, when the temperature of the heating plate is too high, the power is cut off through the circuit board to avoid accidental burns.

8. The assembly structure of the crutch handle of claim 7, wherein the upper cover is made of metal having flexible characteristics, so that after the plug pin penetrates into the plug hole of the top case, its end can be turned over and bent to be fastened and fixed to achieve the positioning purpose.

9. The assembly structure of the crutch handle of claim 1, wherein the assembly part of the handle body is assembled at one end of a crutch tube body, the crutch tube body is hollow and has a battery chamber inside, the battery can be moved down from the battery room of the assembly part to the battery chamber, and a cushion pad is provided at the bottom of the battery chamber.

\* \* \* \* \*